United States Patent
Zhang et al.

(10) Patent No.: US 12,335,984 B2
(45) Date of Patent: Jun. 17, 2025

(54) METHOD PERFORMED BY A USER EQUIPMENT FOR HANDLING COMMUNICATION IN A WIRELESS COMMUNICATION NETWORK

(71) Applicant: Telefonaktiebolaget LM Ericsson (publ), Stockholm (SE)

(72) Inventors: Congchi Zhang, Shanghai (CN); Marco Belleschi, Solna (SE); Shehzad Ali Ashraf, Aachen (DE); Zhang Zhang, Beijing (CN); Ricardo Blasco Serrano, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 246 days.

(21) Appl. No.: 17/425,011

(22) PCT Filed: Jan. 22, 2020

(86) PCT No.: PCT/SE2020/050052
§ 371 (c)(1),
(2) Date: Jul. 22, 2021

(87) PCT Pub. No.: WO2020/153895
PCT Pub. Date: Jul. 30, 2020

(65) Prior Publication Data
US 2022/0132491 A1    Apr. 28, 2022

(51) Int. Cl.
*H04W 72/51*    (2023.01)
(52) U.S. Cl.
CPC .................................. *H04W 72/51* (2023.01)

(58) Field of Classification Search
CPC ....... H04W 72/02; H04W 4/40; H04W 76/14; H04W 28/0226; H04W 56/0045; H04W 72/51; H04W 80/02; H04L 27/2666
USPC ....... 375/340; 455/552.1; 370/129, 329, 340
See application file for complete search history.

(56) References Cited

U.S. PATENT DOCUMENTS

| | | | | |
|---|---|---|---|---|
| 8,953,720 | B1 * | 2/2015 | Palanivelu | .......... H04L 27/2666 375/340 |
| 11,012,194 | B2 * | 5/2021 | Zhang | ................... H04L 5/0044 |
| 11,582,834 | B2 * | 2/2023 | Kang | .................... H04L 1/1896 |
| 11,589,417 | B2 * | 2/2023 | Miao | ..................... H04W 76/14 |

(Continued)

FOREIGN PATENT DOCUMENTS

| | | | | |
|---|---|---|---|---|
| CN | 106797676 | | * 5/2017 | |
| CN | 110324784 A | * | 10/2019 | ........... H04L 69/321 |

(Continued)

OTHER PUBLICATIONS

English translation of CN106797676 May 2023 (Year: 2023).*

(Continued)

*Primary Examiner* — William D Cumming
(74) *Attorney, Agent, or Firm* — Rothwell, Figg, Ernst & Manbeck, P.C.

(57) ABSTRACT

Embodiments herein relate to a method performed by a UE (10) for handling communication in a wireless communication network. The UE (10) handles one or more data units based on a communication range requirement of one or more services, wherein the one or more data units are associated (Continued)

with the one or more services, by using a mapping of an indication of a communication range requirement and a radio resource for communication.

16 Claims, 12 Drawing Sheets

(56) References Cited

U.S. PATENT DOCUMENTS

| | | | | |
|---|---|---|---|---|
| 2019/0116586 | A1* | 4/2019 | Basu Mallick | H04W 72/02 |
| 2020/0281007 | A1* | 9/2020 | Sun | H04W 4/40 |
| 2020/0323023 | A1* | 10/2020 | Miao | H04W 76/14 |
| 2020/0351981 | A1* | 11/2020 | Kang | H04L 1/1896 |
| 2020/0403731 | A1* | 12/2020 | Zhang | H04W 76/14 |
| 2022/0132491 | A1* | 4/2022 | Zhang | H04W 72/51 |
| 2023/0189397 | A1* | 6/2023 | Kang | H04W 80/02 370/329 |

FOREIGN PATENT DOCUMENTS

| | | |
|---|---|---|
| JP | 2007-328564 A | 12/2007 |
| TW | 201304474 A1 | 1/2013 |
| WO | 2010/071510 A1 | 6/2010 |
| WO | 2019/184763 A1 | 10/2019 |
| WO | 2019/184787 A1 | 10/2019 |
| WO | WO-2020153895 A1 * | 7/2020 ........ H04W 28/0226 |
| WO | WO-2020222600 A1 * | 11/2020 ........... H04L 1/1812 |

OTHER PUBLICATIONS

English translation of CN110324784A Sep. 2023 (Year: 2023).*
Vivo, "Communication range for NR V2X", 3GPP TSG-RAN WG2 Meeting#103bis, R2-1813926, Chengdu, China, Oct. 8-12, 2018 (3 pages).
Huawei et al., "QoS management for NR V2X", 3GPP TSG RAN WG1 Ad-Hoc Meeting 1901, R1-190029, Taipei, Jan. 21-25, 2019 (4 pages).
Zte et al., "Discussion on QoS management", 3GPP TSG RAN WG1 Meeting #95, R1-1813174, Spokane, USA, Nov. 12-16, 2018 (3 pages).
International Search Report and Written Opinion issued in International Application No. PCT/SE2020/050052 dated May 5, 2020 (11 pages).
3GPP TS 22.186 V16.0.0 (Sep. 2018), 3rd Generation Partnership Project; Technical Specification Group Services and System Aspects; Enhancement of 3GPP support for V2X scenarios; Stage 1 (Release 16), Sep. 2018 (16 pages).
3GPP TR 22.886 V16.0.0 (Jun. 2018), 3rd Generation Partnership Project; Technical Specification Group Services and System Aspects; Enhancement of 3GPP support for 5G V2X Services; (Release 16), Jun. 2018 (67 pages).

* cited by examiner

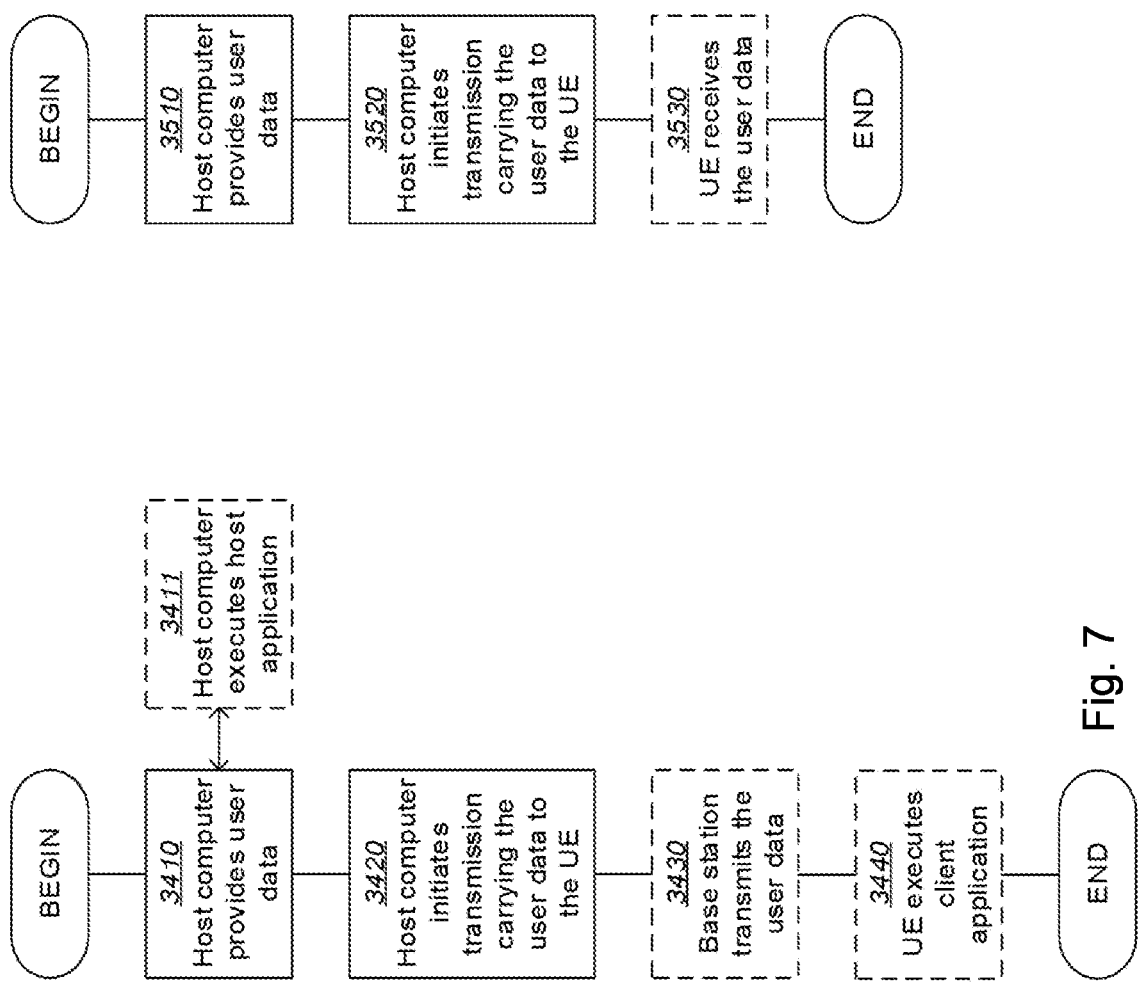

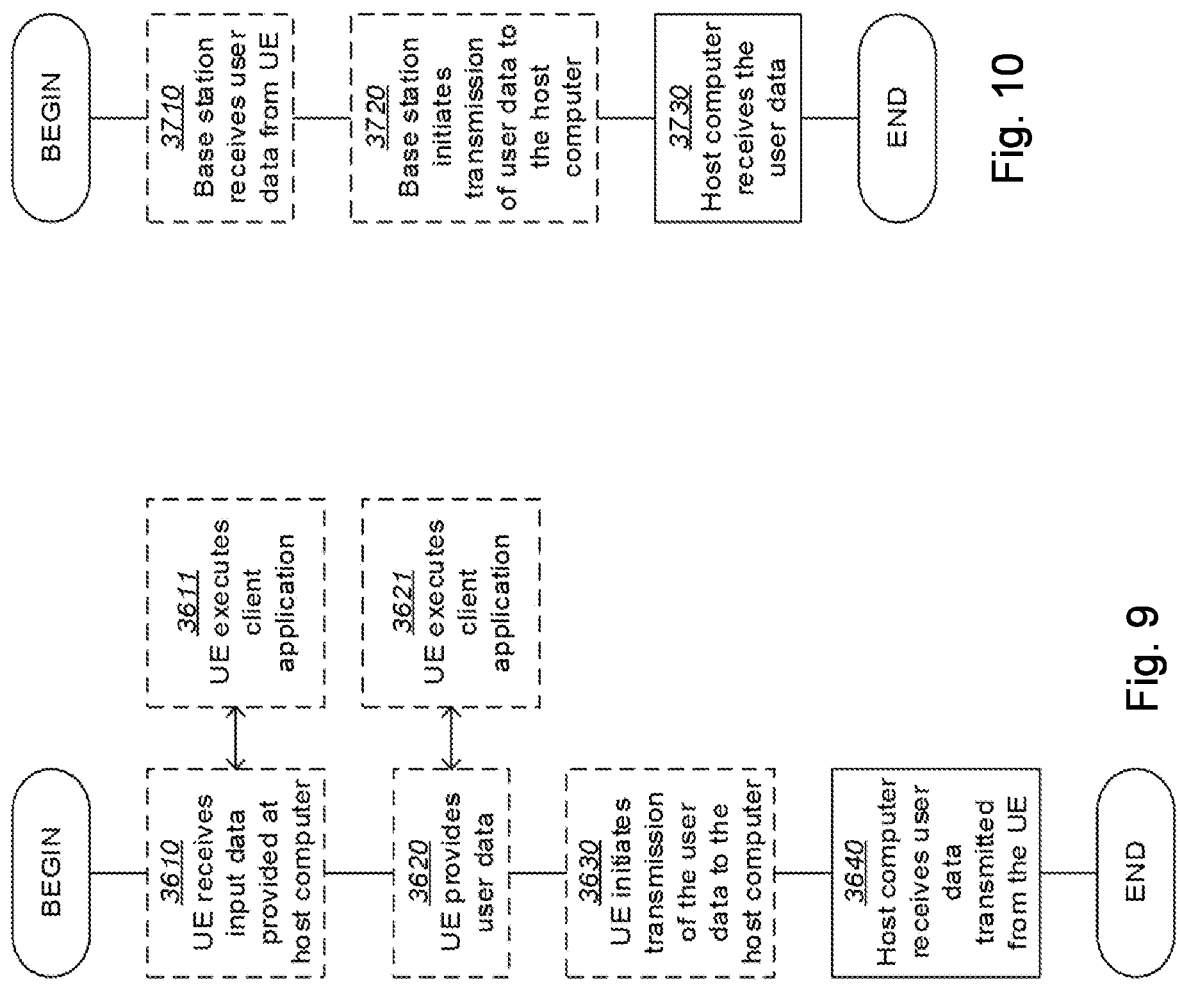

METHOD PERFORMED BY A USER EQUIPMENT FOR HANDLING COMMUNICATION IN A WIRELESS COMMUNICATION NETWORK

CROSS REFERENCE TO RELATED APPLICATIONS

This application is a 35 U.S.C. § 371 National Stage of International Patent Application No. PCT/SE2020/050052, filed Jan. 22, 2020, which claims priority to International Patent Application No. PCT/CN2019/072811, filed Jan. 23, 2019. The above identified applications are incorporated by this reference.

TECHNICAL FIELD

Embodiments herein relate to a user equipment (UE), a radio network node and methods performed therein regarding wireless communication. In particular, embodiments herein relate to handling communication of UEs in a wireless communication network.

BACKGROUND

In a typical wireless communication network, user equipments (UE), also known as wireless communication devices, mobile stations, wireless devices, stations (STA) and/or, may communicate via a Radio Access Network (RAN) to one or more core networks (CN). The RAN covers a geographical area which is divided into service areas, also known as cells, with each cell being served by a radio network node e.g., a W-Fi access point or a radio base station (RBS), which in some networks may also be called, for example, a NodeB, an eNodeB or a gNodeB. The cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. different generation networks, and investigate enhanced data rate and radio capacity and upcoming generation networks. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

The 3GPP standard for telecommunications is continuously developing into different versions or releases. During Release 12, the LTE standard was extended with a support of device to device (D2D) features, also referred to as sidelink features, targeting both commercial and Public Safety applications. Some applications enabled by Rel-12 LTE are enabled with a device discovery feature, where UEs are able to sense the proximity of another UE and an associated application by broadcasting and detecting discovery messages that carry UE identities and application identities. Another application consists of direct communication between UEs, based on physical channels terminated directly between the UEs. In 3GPP, all of these applications are defined under an umbrella named Proximity Services (ProSe).

In release Rel-14, the extensions for the device to device (D2D) work consist of support of vehicle to anything (V2X) communication, which includes any combination of direct communication between vehicles, pedestrians and infrastructure. V2X communication may take advantage of a network (NW) infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure as in V2I, pedestrian as in V2P, and other vehicles as in V2V, as compared to using a dedicated V2X technology.

V2X communications may carry both non-safety and safety information, where each of the applications and services may be associated with specific requirements sets, e.g., in terms of latency, reliability, capacity, etc. From the application point of view, V2X includes the following types of communication/services, see FIG. 1A.

Vehicle to vehicle (V2V): This covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information, such as position, direction, and speed, transmitted to other vehicles in the proximity repeatedly e.g. every 100 ms-1 s. Another example is the transmission of a decentralized environmental notification message (DENM), which is an event-triggered message to alert vehicles. These two examples are taken from the ETSI Intelligent Transport Systems (ITS) specification of V2X applications, which also specifies the conditions under which the messages are generated. Main characteristic of V2V applications is the tight requirements on latency that can vary from 20 ms, e.g. for pre-crash warning messages, to 100 ms for other road safety services.

Vehicle to infrastructure (V2I): This comprises communication between vehicles and e.g. a Roadside Unit (RSU). The RSU is a stationary transportation infrastructure entity which communicates with vehicles in its proximity. An example of V2I is a transmission of speed notifications from the RSU to vehicles, as well as queue information, collision risk alerts, curve speed warnings. Due to the safety related nature of V2I, delay requirements are similar to V2V requirements.

Vehicle to pedestrians (V2P): This covers communication between vehicles and vulnerable road users, such as pedestrians, using V2P applications. V2P typically takes place between distinct vehicles and pedestrians either directly or via infrastructure such as a cellular network.

Vehicle to network (V2N): This covers communication between a vehicle and a centralized application server, or an Intelligent Transportation System (ITS) Traffic Management Center, both using V2N applications, via infrastructure, such as a cellular network. One example is a bad road condition warning sent to all vehicles in a wide area, or traffic flow optimization in which V2N application suggests speeds to vehicles and coordinates traffic lights. Therefore, V2N messages are supposed to be controlled by a centralized entity, i.e. the Traffic Management Center, and provisioned to vehicles in a large geographical area, rather than in a small area. Additionally, unlike V2V or V2I, latency requirements are more relaxed in V2N because it is not meant to be used for safety purposes, e.g. 1 s latency requirement is typically considered.

Only broadcast is supported over sidelink (SL) in LTE V2X.

In the following, it is described more in details the SL resource allocation specified in 3GPP for LTE V2X. In LTE SL V2X, there are two different resource allocation (RA) procedures for V2X on sidelink, i.e. centralized RA, so called "mode 3", and distributed RA, so called "mode 4". The transmission resources are selected within a resource pool which is predefined or configured by the network (NW).

With centralized or NW-scheduled RA i.e. mode-3, the transmitting sidelink radio resources are dynamically scheduled and/or allocated by the NW. Similar to Uu-interface scheduling, the UE requests resources for transmissions to the NW using uplink signaling, e.g. transmitting scheduling request (SR) and/or sidelink buffer status report (SL-BSR), and as a response, the NW i.e. a radio network node, may grant resources via physical downlink control channel (PDCCH) for sidelink transmission to the UE. Depending on network decision, the grant provided by the NW may be valid for the transmission of a single transport block (TB), including its retransmission, or for the transmission of multiple TBs over multiple periodic resources as for the semi-persistent scheduling (SPS) grant.

With distributed or autonomous RA, i.e. mode-4, it is intended a resource allocation scheme in which the network provides a set of resources in broadcast fashion to be used on a certain carrier. Such resources are then contended by UEs interested in sidelink operations, according to certain rules. In particular, a UE before using certain resources shall sense such resources for some time, and in case the resources are deemed to be free it can select them for sidelink transmissions. Sensing is based on decoding the sidelink control information (SCI) sent over the physical sidelink control channel (PSCCH) and reference signal received power (RSRP) measurement of physical sidelink shared channel (PSSCH) from surrounding UEs. To enable such sensing-based resource allocation, no UE specific scrambling is adopted which implies on sidelink a UE cannot be recognized in L1.

Depending on the specific service to be transmitted, the UE may either reserve such resources for multiple transmissions according to a desired pattern, which is repeated periodically in the time domain, or it can simply select such resource for a single "one-shot" transmission. The resources reserved by UEs for SL transmissions are announced in the SCI over the PSCCH. The SCI is also used to provide the receiver with other useful information related to a transmission on the PSSCH, for example to indicate whether there is a new transmission or retransmission, the modulation and coding scheme (MCS) of the PSSCH, etc.

The V2X ecosystem depicted in FIG. 1A for LTE applies also to NR network. However, compared with LTE, NR V2X is expected to support a new set of use cases both for sidelink and Uu communications. In particular, 3GPP SA1 working group has identified new service requirements for future V2X services. SA1 has identified twenty five use cases for advanced V2X services which will be used in 5G. Such use cases are categorized into four use case groups: vehicles platooning, extended sensors, advanced driving and remote driving. The consolidated requirements for each use case group are captured in TS 22.886 V16.0.0, "Study on enhancement of 3GPP Support for 5G V2X Services (Release 16)". Direct unicast/multicast transmission over sidelink will be needed in some use cases such as platooning, cooperative driving, dynamic ride sharing, etc. TS 22.186 V16.0.0, "Service requirements for enhanced V2X scenarios" further defines five categories of requirements and five level of automations to better group various V2X service requirements, which are characterized by:

Payload measured in Bytes;
Transmission rate measured in Message/Sec;
Maximum end-to-end latency measured in ms;
Reliability measured in %;
Data rate measured in Mbps;
Minimum required communication range measured in meters.

While the SL NR resource allocation framework is expected to roughly take the LTE V2X framework described herein as baseline, some fundamental enhancements will be needed to fulfil the NR requirements. For example, in order to meet these requirements some improvements need to be introduced in layer-1 and layer-2 access stratum (AS) protocols, to enforce link adaption and QoS handling. Such enhancements include for instance SL channel state information (CSI) feedback, SL hybrid automatic repeat request (HARQ) feedback, automatic repeat request (ARQ) schemes, radio link control acknowledged mode (RLC AM), quality of service (QoS) admission control, etc.

Additionally, NR V2X services are expected to be transmitted using different casting schemes. In particular for some applications, such as cooperative driving, dynamic ride sharing, video/sensor data sharing etc, unicast will be likely needed. For platooning use cases, groupcast communication would be a preferred option. For broad provisioning of alert messages, broadcast communication is instead preferred. Obviously, depending on the specific casting scheme used, resource allocation will be different, both because of different interference and/or channel conditions, and different QoS requirements.

Communication Range.

As mentioned above, the communication range is one of the new critical parameters which characterize a V2X service. The communication range requirement may be provided by higher layer functionalities such as an application function in the UE or in the cloud, or by any other network node and may be associated to a given V2X service. In fact, depending on the content of a V2X packet, a different minimum communication range should be guaranteed. That is to achieve at one time reliable information delivery to vehicles in the proximity, and also limited interference towards vehicles which are not interested in such information. For example, considering the use of case of platooning, where a group of vehicles sharing certain mechanical and/or geographical characteristics is moving in one direction, certain packets may need to be transmitted from the lead of the platoon to the last vehicle in the platoon, while other packets may just need to be transmitted to the vehicles which are in the close proximity.

To fulfill the communication range requirements, multiple solutions may be envisaged. For example, flexible power control schemes may be introduced in NR, such that the power is properly tuned depending on the communication range requirement of a given packet. In LTE V2X, such requirement is not present, and the SL power control scheme has been designed with the intent to avoid interference in the UL towards the base station. In fact, in LTE V2X, the SL power control only takes into account the path loss with respect to the radio network node. At the receiver side, the system can be configured such that it is the receiving UE that discards a received packet if the receiving UE is located in a position which is beyond the communication range of such received packet. While this does not solve the interference problems in the system, it avoids unnecessary processing at the receiver.

SUMMARY

A V2X service may be associated with a communication range requirement by higher layer functionalities such as an application function in the UE or in the cloud, or by any other network node. Depending on the specific V2X service, RAN layers, such as MAC, or PHY may apply different procedures to fulfill the communication range requirements. For example, the transmitter, e.g. at PHY layer, may apply different power control rules and use different power control parameters depending on the communication range requirement; and/or the receiving UE, e.g. at PHY layer, may discard the packet if the receiving UE itself is located in a geographical position which is beyond the communication range of the received packet.

However, irrespective of whether any or both solutions above are applied, PHY layer just receives from upper layers a transport block and the upper layers might not be aware of the specific V2X service that such packet contains. How to transfer the information related to the communication range requirement of a given packet to lower layers is currently not addressed in 3GPP RAN specifications. In other word, it is unclear how to enable and/or support solutions above by 3GPP RAN and leverage the communication range requirement.

MAC service data unit (SDU) multiplexing.

As illustrated in FIG. 1B, media access control (MAC) layer is responsible of multiplexing MAC SDUs from one or different logical channels onto transport blocks (TB) to be delivered to the physical layer on transport channels. It should herein be noted that different logical channels may be associated with different QoS requirements and/or parameters, e.g. communication range. For a TB contains multiple MAC SDUs of different QoS requirements and/or parameters, it is up to implementation how to treat it in MAC layer and physical (PHY) layer.

Thus, an additional problem arises due to the possible multiplexing of MAC SDUs at the transmitter. In general, different MAC SDUs may be associated with different communication range requirements. Consequently, the UE access stratum (AS) should know whether MAC SDUs associated to different communication ranges can be multiplexed or not into the same MAC protocol data unit (PDU). In fact, depending on the communication range requirements of the MAC SDUs multiplexed into the same MAC PDU, the power control at the transmission (TX) side and the filtering function at the reception (RX) side may be affected. For example, the power control might not be efficient if into the same MAC PDU, the MAC layer multiplexes MAC SDUs which have very different communication range requirement. That can be the case in which layer-2 or layer-3 control signaling, such as SL radio resource control (RRC) signaling, SL MAC control element (CE) etc, are multiplexed together with SL data. That is because layer-2 or layer-3 control signaling might have large communication range values since it delivers control configuration information for a large number of UEs in a large area also far away from the transmitting UE, whereas SL data might just target few UEs in a smaller area in the proximity of the transmitting UE.

An object herein is to provide a mechanism to in an efficient manner enable communication, such as V2X communication, in a wireless communication network.

According to an aspect the object is achieved, according to embodiments herein, by providing a method performed by a UE for handling communication in a wireless communication network. The UE handles one or more data units based on a communication range requirement of one or more services by using a mapping between the communication range requirement of the one or more data units and an indication of a radio resource associated to communication, wherein the one or more data units are associated with the one or more services. The UE may be configured (preconfigured or received from a radio network node) with e.g. a mapping between an indication of a radio resource such as an identifier (e.g. LCID or DRB ID or resource pool ID or CRG) and an indication of one or more communication ranges (e.g. values or equivalent IDs).

According to another aspect the object is achieved, according to embodiments herein, by providing a method performed by a radio network node for handling communication of one or more UEs in a wireless communication network. The radio network node configures a user equipment with a mapping of an indication of a communication range requirement of one or more data units and an indication of a radio resource associated to communication. The indication of radio resource may be e.g. an identity of a radio bearer such as a DRB ID, identity of a radio resource pool or a logical channel identity.

It is furthermore provided herein a computer program product comprising instructions, which, when executed on at least one processor, cause the at least one processor to carry out any of the methods above, as performed by the radio network node or the UE, respectively. It is additionally provided herein a computer-readable storage medium, having stored thereon a computer program product comprising instructions which, when executed on at least one processor, cause the at least one processor to carry out the method according to any of the methods above, as performed by the radio network node or the UE, respectively.

According to embodiments herein a radio network node and UEs are also herein provided configured to perform the methods herein. According to an aspect the object may be achieved by providing a UE for handling communication in a wireless communication network. The UE is configured to handle one or more data units based on a communication range requirement of one or more services, wherein the one or more data units are associated with the one or more services, by using a mapping between the communication range requirement of the one or more data units and an indication of a radio resource associated to communication.

According to another aspect the object may be achieved by providing a radio network node for handling communication of one or more user equipment, UEs, in a wireless communication network, wherein the radio network node is configured to configure a user equipment with a mapping of an indication of a communication range requirement of one or more data units and an indication of a radio resource associated to communication.

Methods and devices are proposed herein to enable access stratum communication to make use of communication range parameter for communicating in an efficient manner e.g. for optimizing power control and resource allocation.

BRIEF DESCRIPTION OF THE DRAWINGS

Embodiments will now be described in more detail in relation to the enclosed drawings, in which:

FIG. 7 shows methods implemented in a communication system including a host computer, a base station and a user equipment in accordance with some embodiments;

FIG. 8 shows methods implemented in a communication system including a host computer, a base station and a user equipment in accordance with some embodiments;

FIG. 9 shows methods implemented in a communication system including a host computer, a base station and a user equipment in accordance with some embodiments; and FIG. 10 shows methods implemented in a communication system including a host computer, a base station and a user equipment in accordance with some embodiments.

DETAILED DESCRIPTION

Figure 1A:
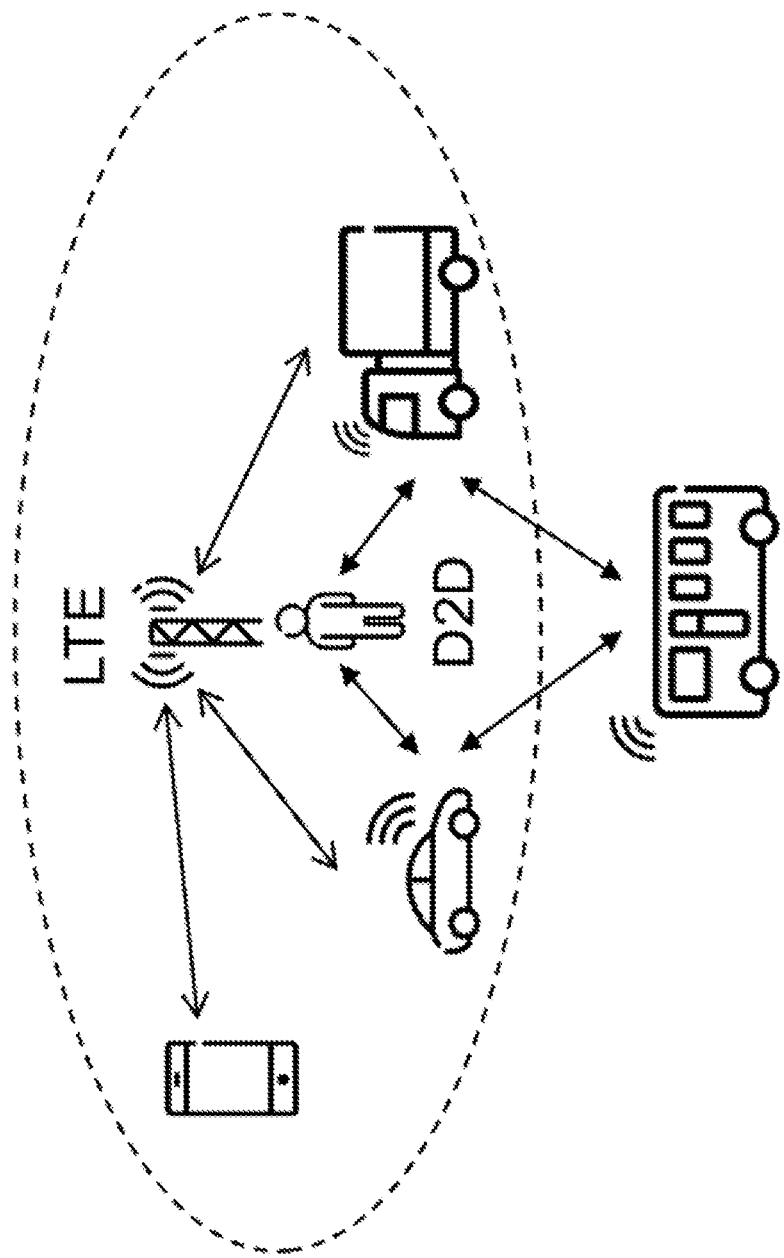
FIG. 1A is an overview depicting different vehicle communications.
Figure 1B:
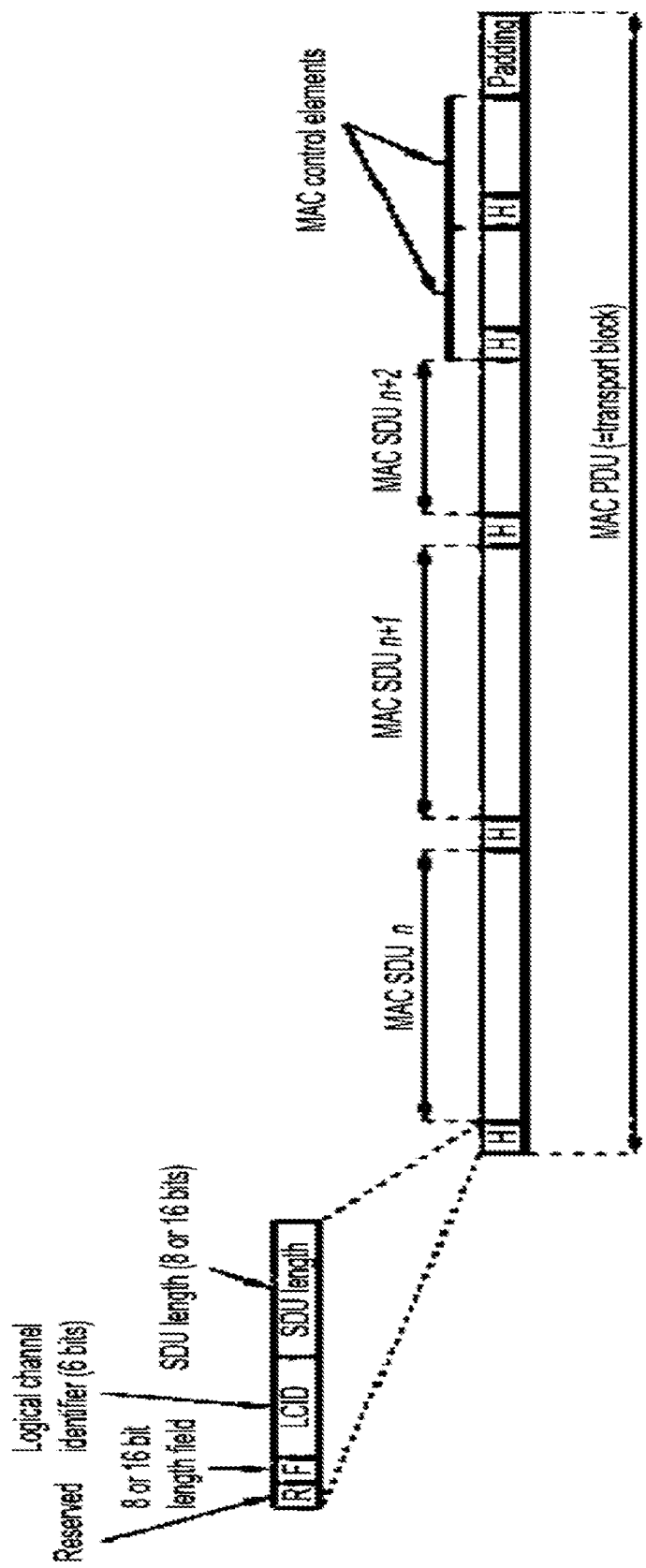
FIG. 1B is an overview depicting MAC SDU multiplexing.
Figure 2A:
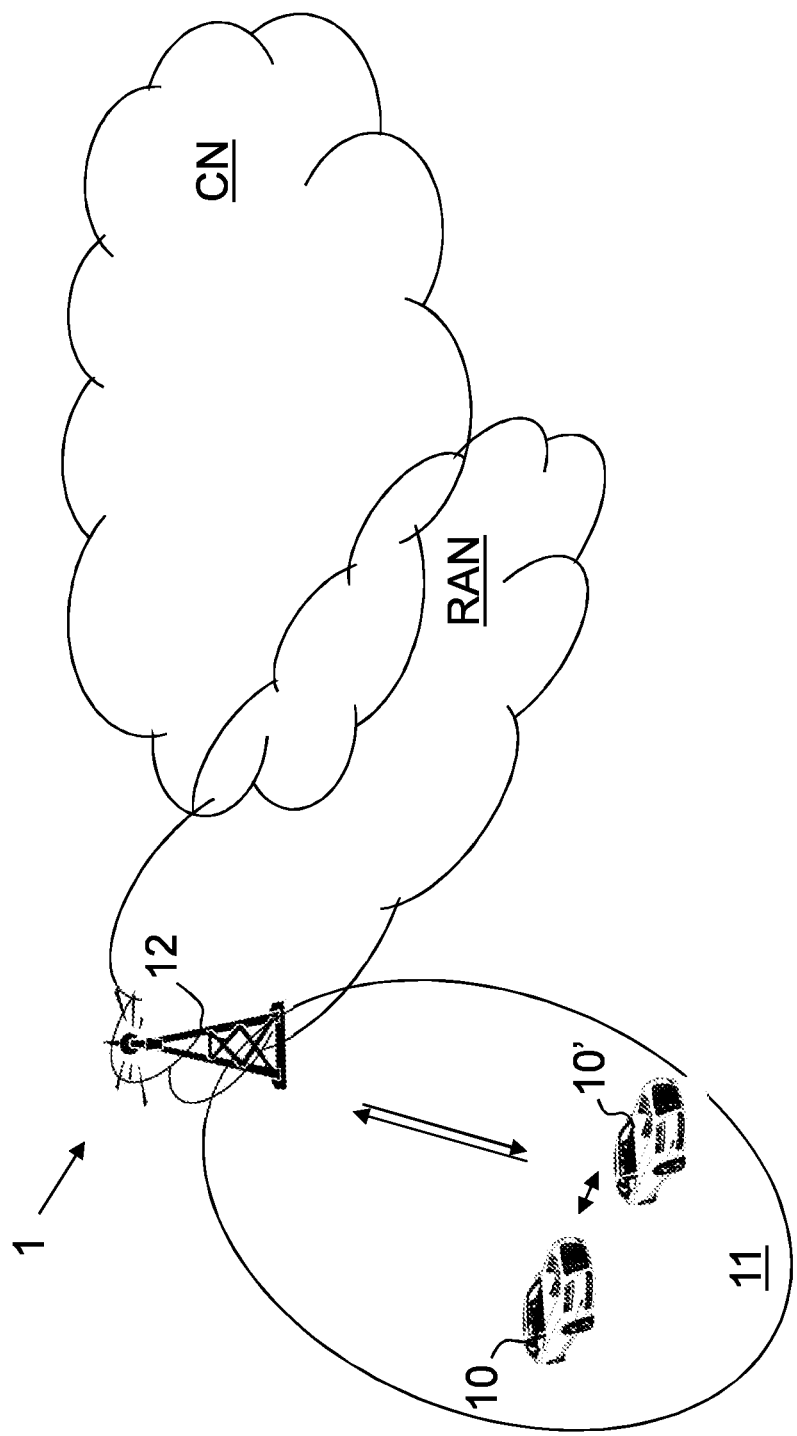
FIG. 2A is a schematic overview depicting a wireless communication network according to embodiments herein.

Embodiments herein relate to wireless communication networks in general. FIG. 2A is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context, however, embodiments are also applicable in further development of existing wireless communication systems such as e.g. LTE and Wideband Code Division Multiple Access (WCDMA).

In the wireless communication network 1, wireless devices configured to communicate with one another over a sidelink (SL) e.g. a transmitting UE 10, also referred to as the UE, communicating with another or receiving UE 10', such as a Device to device terminal in a vehicle e.g. a mobile station, a non-access point (non-AP) station (STA), a STA, a user equipment and/or a wireless terminal, may be configured for communication from a NW for e,g, V2X communication. It should be understood by the skilled in the art that "UE" is a non-limiting term which means any terminal, wireless communication terminal, wireless device, narrowband-internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node or a wireless device. Embodiments herein may relate to vehicle to anything communication wherein the transmitting UE 10 may be a vehicle and the receiving UE 10' may be a stop sign (V2I), a radio network node (V2N), a device on a pedestrian (V2P), or another vehicle (V2V) or vice versa. That is, the receiving UE 10' may be a vehicle and the transmitting UE 10 may be a stop sign (V2I), a radio network node (V2N), a device on a pedestrian (V2P), or another vehicle (V2V).

The wireless communication network 1 comprises a radio network node 12 providing radio coverage over a geographical area, a service area 11 or cell, of a first radio access technology (RAT), such as NR, LTE or similar. The radio network node 12 configures the sidelink for the UEs e.g. perform resource allocation or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node wherein the service area may be referred to as a serving cell, and the serving network node communicates with the UEs in form of DL transmissions to the UEs and UL transmissions from the UEs. It should be noted that a service area may be denoted as cell, beam, beam group or similar to define an area of radio coverage.

According to embodiments herein the UE 10 handles, e.g. multiplexes or resource allocates for, one or more data units based on a communication range requirement of one or more services by using a mapping between the communication range requirement, of the one or more data units, and an indication of a radio resource associated to communication, wherein the one or more data units are associated with the one or more services.

Embodiments herein target e.g. sidelink enhanced V2X services, which are associated with the communication range requirement. Methods for access stratum, i.e. radio communication, to leverage communication range to optimize power control and resource allocation.

Embodiments herein disclose use of a communication range in per bearer QoS model.

In MAC, one MAC SDU is associated to one logical channel, identified by an logical channel ID (LCID). The specific LCID associated to one MAC SDU may depend on the V2X service that such MAC SDU contains. For example, in case sidelink radio bearers are defined, one enhanced V2X (eV2X) service might be mapped to one QoS flow and then to one radio bearer at access stratum, identified by a data radio bearer (DRB) identity. In turn all the MAC SDUs associated to this radio bearer may be represented by a specific LCID.

In one method, it is claimed that the communication range values required for eV2X services are provided by upper layer to access stratum, and the access stratum is (pre) configured such that the communication range values are grouped and associated to proper identifiers. For example, one or more communication range values, e.g. those communication range values between 50 m and 100 m, may be associated and/or mapped in the access stratum to a specific and unique identifier. In one case, those one or more communication range values can be associated and/or mapped by configuration to a specific LCID or to a specific DRB identity, or to a resource pool identity, or to a communication range group (CRG).

In a second method rather than the mapping between communication range values and said identifiers such as LCID or DRB ID or resource pool ID or CRG, it is provided the mapping between an ID representing each communication range value and then mapping between a set of such communication range representing IDs and the said identifiers such as LCID or DRB ID or resource pool ID or CRG. The communication range ID associated to each possible communication range value is also (pre)configured. Thus, the ID may be an indication of the communication range.

The mapping between the said identifier such as LCID or DRB ID or resource pool ID or CRG, and the one or more communication ranges (values or equivalent IDs) may be provided to the UE 10 in the following way:

1. The network, i.e. the radio network node 12, may provide the aforementioned mapping via RRC and configured as part of a sidelink radio bearer configuration.
2. The network, i.e. the radio network node 12, may provide the aforementioned mapping via system information block (SIB) signaling (e.g. the pool configurations).
3. The radio network node 12 may provide the aforementioned mapping via dedicated signaling, i.e. as part of sidelink V2X dedicated configuration.
4. The UE 10 may provide the aforementioned mapping over sidelink to other UEs, such as the receiving UE 10' or vice versa, i.e. The receiving UE 10' may provide the aforementioned mapping over sidelink to other UEs, such as the UE 10.
5. The aforementioned mapping may be preconfigured at the UE 10.

Option 1 and 2 and 3 may be used by the transmitting UE 10 in e.g. logical channel prioritization and/or the resource pool selection procedures, and to tune the power control or to determine the geographical relevance of the packet being transmitted. For example, option 1 and 3 can be used for a transmitting UE 10 which is configured by the network to operate in network-scheduled mode, while option 2 and 4 in case it is configured to operate in autonomous mode and option 5 if the UE is out-of-coverage.

Option 2, 4 and 5 can be also used by the receiving UE 10' to determine the communication range of a given received packet.

More detailed embodiments related to the transmitter and receiver are disclosed in the following.

Figure 2B:
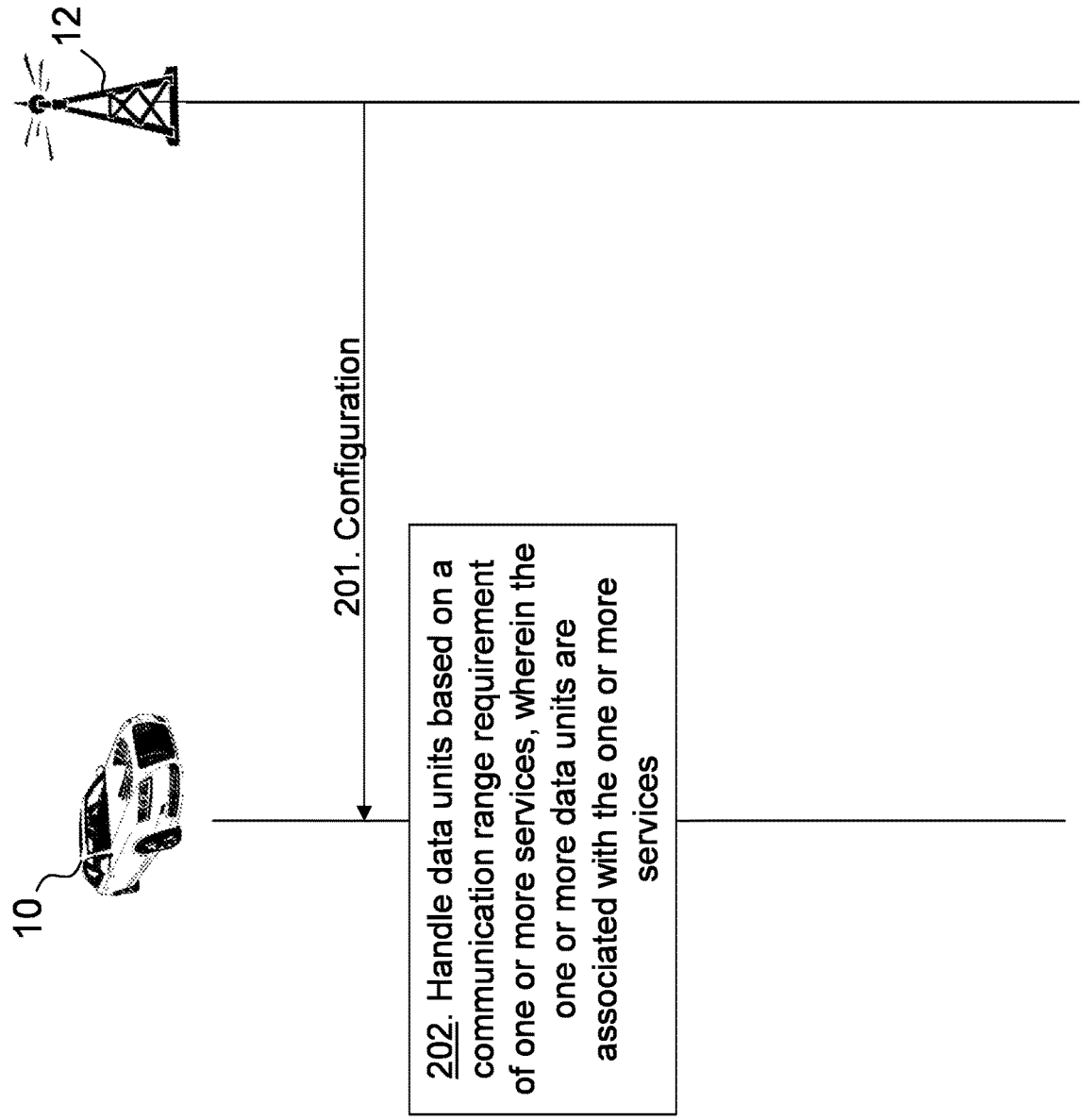
FIG. 2B shows a combined flowchart and signalling scheme according to embodiments herein.

FIG. 2B is a combined flowchart and signaling scheme according to embodiments herein.

Action 201. The radio network node 12 or pre-configuration of the UE 10 may indicate the mapping of the communication range requirement and the radio resource such as data radio bearer, a radio resource such as preamble, frequency, symbol or time, logical channel or similar. Thus, the UE 10 obtains the mapping between the indication of the communication range requirement of a data unit, and the indication of the radio resource associated to communication. E.g. the UE 10 receives a mapping between the said identifier, e.g. LCID or DRB ID or resource pool ID or CRG, and the one or more communication ranges, values or equivalent IDs. The radio network node 12 may thus configure the UE 10 with the mapping of the indication of the communication range requirement and the indication of the radio resource e.g. LCID, DRB, resource pool. The one or more communication range values may be associated or mapped by configuration, e.g. RRC configuration, to a specific LCID or to a specific DRB identity, or to a resource pool identity, or to a communication range group (CRG).

Action 202. The UE 10 handles one or more data units based on a communication range requirement of one or more services, wherein the one or more data units are associated with the one or more services. E.g. it may be multiple SDUs multiplexed into one PDU. E.g. the UE 10 may multiplex data units into a same protocol data unit (PDU), wherein the data units have a set communication range requirements. E.g. the UE may multiplex data units into a same protocol data unit, of all logical channels associated to a same communication range requirement. E.g. the UE 10 may transmit data units in, e.g. use, resources from a resource pool with a matching communication range requirement. E.g. the UE 10 may perform the following based on the communication range requirement e.g.: perform a logical channel prioritization procedure; perform a resource pool selection procedure; perform a power control of a transmission; perform a determination of packet geographical relevance; determine a sensing and a resource allocation parameter; determine content of sidelink control information, SCI, on a physical sidelink control channel, PSCCH; and/or determine a congestion control parameter. The UE may be a receiving UE 10' e.g. determining whether to discard a received packet or not based on communication range requirement.

Figure 3A:
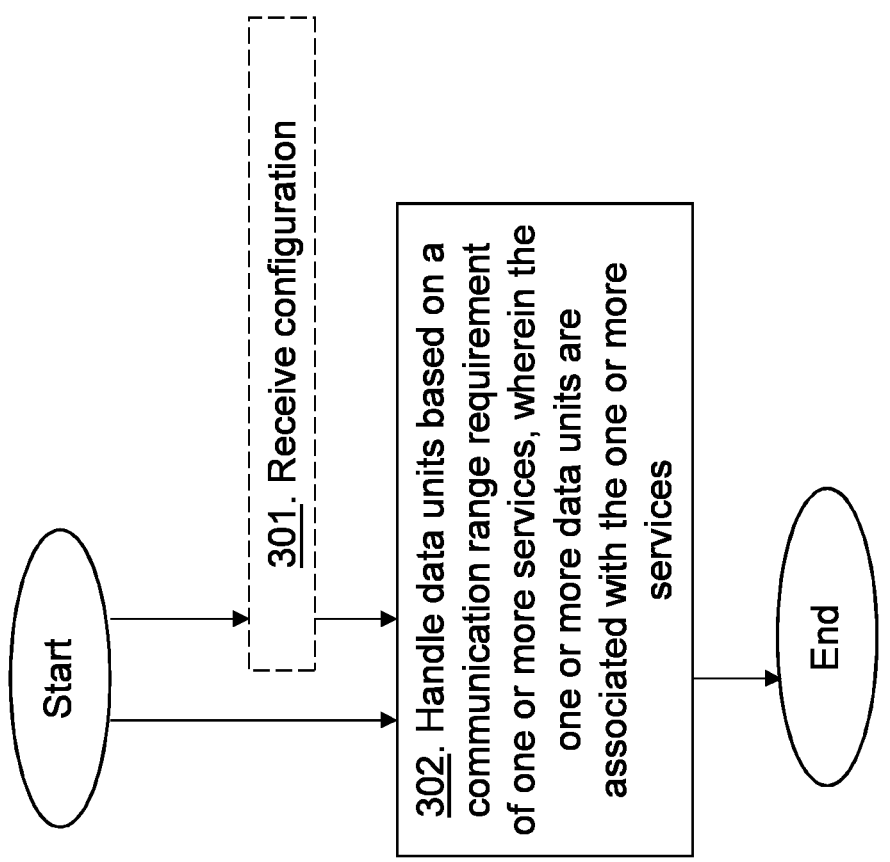
FIG. 3A shows a flowchart of a method performed by a UE according to embodiments herein.

The method actions performed by the UE 10 for handling communication in the wireless communication network 1 according to embodiments will now be described with reference to a flowchart depicted in FIG. 3A. The actions do not have to be taken in the order stated below, but may be taken in any suitable order. Actions performed in some embodiments are marked with dashed boxes.

Action 301. The UE 10 may obtain the mapping from the radio network node, another UE 10' or internally.

Action 302. The UE 10 handles one or more data units based on a communication range requirement of one or more services by using a mapping between the communication range requirement of the one or more data units and an indication of a radio resource associated to communication. The one or more data units are associated with the one or more services. The UE 10 may handle the one or more data units by multiplexing data units into a same protocol data unit, wherein the data units have a set communication range requirement. The UE 10 may handle the one or more data units by multiplexing data units into a same protocol data unit, of all logical channels associated to a same communication range requirement. The UE 10 may handle the one or more data units by transmitting data units in resources from a resource pool with a matching communication range requirement. One or more communication range values may be mapped to a specific LCID or to a specific DRB identity, or to a resource pool identity, or to a communication range group.

The UE 10 may handle the one or more data units by performing a logical channel prioritization procedure. The transmitting UE 10 may be configured by the radio network node 12 or preconfigured with a logical channel restriction such that the UE 10 is allowed to multiplex into the same MAC PDU only the MAC SDUs having certain communication range requirements. To realize that, the different communication range requirements may be grouped into different sets containing different possible communication range values. For example, the (pre)configuration may provide a list where each element in the list correspond to a communication range group (CRG) and contains a sequence of one or more communication range values as follows:

Element A: {50 m, 100 m, 150 m}
Element B: {200 m, 250 m}
Element C: {300 m and above}

In the above example, the UE 10 is allowed to multiplex in the same MAC PDU, all the logical channels associated to MAC SDUs having range requirements between 50m and 150 ms, all the MAC SDUs having range requirements between 200m and 250 m, and all the MAC SDUs having range requirements above 300m. The UE 10 is not allowed to multiplex in the same MAC PDU, the logical channels associated to MAC SDUs having for example 50m and 250m range requirement. This logical channel restriction is beneficial because the power control will be applied to a MAC PDU, i.e. to the transport block delivered by MAC to PHY, and the power control parameters may be different in case the range requirements are very different. Therefore, it could be beneficial to avoid that the logical channels associated to MAC SDUs have very different range requirements, i.e. range requirements included in different elements of the aforementioned list by (pre)configuration, is not multiplexed by the logical channel prioritization procedure into the same MAC PDU, i.e. into the same TB.

In another example, the elements of the aforementioned list are expressed in the forms of other said identifiers, e.g. LCIDs, or LCGs, or DRB identities, or CRG IDs, meaning that the logical channel prioritization procedure shall include into the same MAC PDUs only the MAC SDUs associated to the said identifiers included in one element of the aforementioned list.

When generating a MAC PDU, we may first perform logical channel prioritization without considering communication range requirement for the first logical channel. After that, only logical channels that are associated to the same CRG as the first logical channel or have lower range requirement than the first logical channel are allowed to be multiplexed in that MAC PDU. The CRG or the highest range requirement of the first logical channel in a MAC PDU may be adopted to represent the range requirement of the MAC PDU (at MAC layer).

Alternatively or additionally, the UE 10 may handle the one or more data units by performing a resource pool selection procedure. E.g. a transmission (Tx) resource pool may be (pre)configured to be associated with certain communication range requirement e.g. communication range values or the corresponding range IDs. A MAC PDU may only be transmitted in the resources from the resource pool with matching communication range requirements, for instance, only resource from the resource pools have the same and/or larger range requirement than that of the MAC PDU may be used to transmit the MAC PDU.

Alternatively or additionally, the UE 10 may handle the one or more data units by performing a power control of a transmission. E.g. the (pre)configuration may also indicate the power control parameters that can be different for different sets of communication range requirements, i.e. for different elements in the aforementioned list. The power control parameters may include for example, the p0 nominal sidelink power, the alpha parameter used for path loss compensation, the p_max maximum power, or any other power adjustment parameter or weight parameter. For example, the (pre)configuration may indicate a lower p0 nominal sidelink power, or a higher power weight factor in case of short range requirements, while a higher power nominal sidelink power, or a lower power weight factor in case of larger range requirements. Similarly, the p_max power can be configured to be higher for larger range requirements and smaller for shorter range requirements.

As mentioned above, one transport block (TB), i.e. MAC PDU, may contain packets from multiple logical channels of different communication range requirements, power control rules or transmission powers. Therefore, the power control parameters for this TB can be determined in various ways and (pre)configured according to any of the following principles:

It can be determined based on the communication range requirement of the MAC PDU.
It can be determined based on the communication range requirement of the resource pool where the MAC PDU is transmitted.
It can be determined following the power control parameters configured for the logical channel which has highest priority
The power control that applies to this TB is the one that gives the highest transmission power upon calculating all the possible transmission powers considering all the logical channels in this TB.

E.g. when there are multiple communication range requirements in one packet, determine whether to further process the packet according to the largest communication range or the smallest.

Alternatively or additionally, the UE 10 may handle the one or more data units by performing a determination of packet geographical relevance. The (pre)configuration may be associated to each CRG, not only the power control parameters but also the geographical relevance, of the packets associated to that CRG. The geographical relevance can be represented by geographical coordinates or one or more geographical zone IDs.

Alternatively or additionally, the UE 10 may handle the one or more data units by determining a sensing parameter, a resource allocation parameter, and/or a congestion control parameter. The (pre)configuration may provide different sensing and resource allocation parameters for different set of communication range requirements, e.g. for different CRG. That is because in e.g. NR sidelink autonomous mode, e.g. mode 2, a sidelink UE may select a set of idle resources, with sensed power less than a threshold, for transmission. For example, for an eV2X service with a large communication range requirement, above a threshold, a given resource can be considered idle only if the power sensed on that resource is low enough, while for shorter communication range requirement the resource can be considered idle when the power sensed over that resource is higher. That implies that different sensing threshold can be configured and associated to different CRG.

The communication range requirements used in determining sensing and resource allocation parameters may take into account the communication range requirements of both the UE performing sensing and the UE(s) being sensed, e.g. the sum of these two communication range requirements.

Alternatively or additionally, the sensing parameters may follow any of the following rules, given that one MAC PDU may contain MAC SDUs having different communication range requirements.

- It can be determined based on the communication range requirement of the MAC PDU.
- It can be determined based on the communication range requirement of the resource pool where the MAC PDU is transmitted
- It can be determined following the sensing threshold determination rule of the logical channel which has highest priority
- It can be the lowest sensing threshold of those associated logical channels
- It can be the sensing threshold of the logical channel which has highest priority The (pre)configuration may also provide parameters used by the resource allocation procedures for each of the CRGs. For example, selection window sizes, backoff window and related parameters, pre-emption parameters (including enabling/disabling pre-emption), etc Furthermore, the (pre)configuration of the congestion control (CC) mechanism and procedures may be defined per CRG. Examples of such parameters are:

- Thresholds on channel occupancy, e.g., channel busy ratios or congestion busy ratios, placing restrictions on whether the UE 10 is allowed to transmit a packet or not and which transmission parameters can be used, e.g., power, amount of radio resources, etc.
- Channel occupancy times, e.g., channel occupancy ratio, and other duty cycle metrics determining the use of the channel by the UE 10 itself.

Alternatively, when transmitting a MAC PDU containing multiple MAC SDUs the UE 10 may:

- Apply the CC configuration based on the CRG or communication range requirement of the MAC PDU,
- Apply the CC configuration based on the CRG or communication range requirement of the resource pool where the MAC PDU is transmitted.
- Apply the CC configuration of the MAC SDU that is most/least restrictive, e.g., in terms of permitting access to the channel, total power, number of radio resources to be used, etc.
- Apply the CC configuration of the MAC SDU that has highest priority.
- Applying a predefined CC configuration for special cases in which there is a conflict between the configurations for each of the MAC SDUs.

Figure 3B:
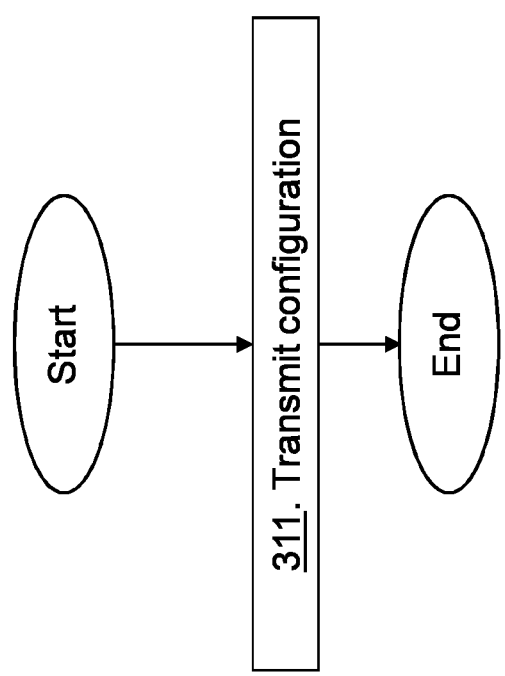
FIG. 3B shows a flowchart of a method performed by a radio network node according to embodiments herein.

Alternatively or additionally, the UE 10 may handle the one or more data units by determining content of SCI on a PSCCH. The transmitting UE 10 may indicate in the SCI transmitted over the PSCCH, the said identifier(s) of the communication range values associated to the MAC SDU included in the MAC PDU. For example, the UE 10 may indicate any combination of one or more of the following parameters:

- The communication range group associated to the MAC PDU being transmitted;
- The communication range requirement value of the logical channel having the highest priority or QoS requirement, among the logical channels multiplexed in the same MAC PDU;
- The LCID having lowest communication range requirement value, among the LCIDs multiplexed in the same MAC PDU;
- The LCID having highest communication range requirement value, among the LCIDs multiplexed in the same MAC PDU;
- The lowest communication range requirement value expressed in meters or in an equivalent ID, assuming that each possible range requirement is associated by configuration to an ID as claimed in the second method in above, among the communication range requirement values of the MAC SDUs multiplexed in the same MAC PDU
- The highest communication range requirement value expressed in meters or in an equivalent ID, assuming that each possible communication range requirement is associated by configuration to an ID, among the communication range requirement values of the MAC SDUs multiplexed in the same MAC PDU; and
- The geographical relevance (i.e. geographical coordinates, or zone IDs) of the communication range group associated to the MAC PDU being transmitted The method actions performed by the radio network node 12 for handling communication of one or more UEs in the wireless communication network 1 according to embodiments will now be described with reference to a flowchart depicted in FIG. 3B. The actions do not have to be taken in the order stated below, but may be taken in any suitable order.

Action 311. The radio network node 12 configures the user equipment with the mapping of the indication of a communication range requirement of one or more data units and the indication of a radio resource associated to communication.

It is herein provided e.g. methods of leveraging communication range parameter associated with a V2X service at access stratum to optimize power control and resource allocation.

- Method to associate communication range parameter with dedicated radio bearer
- Method to associate communication range parameter with MAC PDU.
- Method to associate communication range parameter with resource pool.

Methods to let PHY layer perform range dependent power control, e.g. based on RRC configuration Methods to let MAC layer perform range dependent sensing threshold adaptation, e.g. based on RRC configuration Methods to determine the transmission power and sensing threshold when one TB contains multiple packets Herein procedures on how the communication range requirements affect the UE are disclosed. In particular, the following UE procedures may be affected:
1. The logical channel prioritization procedures
2. The resource pool selection procedures.
3. The power control
4. Determination of packet geographical relevance
5. Sensing and resource allocation parameters
6. The content of SCI on the PSCCH
7. Congestion control parameters The receiving UE 10' upon reading the SCI, which contains information disclosed in the previous embodiments, or depending on in which resource pool the SCI is received, may discard the received packet if the RX UE is not located within the communication range requirement of the received packet. That can be determined by the RX UE 10' considering the following information:

The largest communication requirement value associated to the CRG of the MAC PDU received as indicated in the SCI or the resource pool where SCI is transmitted.

The geographical relevance associated to the CRG of the MAC PDU received as indicated in the SCI.

Considering any of the above and the geographical position of the RX UE 10' (geographical coordinate or zone ID), the RX UE 10' may determine whether to discard the received packet or not based on the geographical position of the RX UE 10'.

Figure 4A:
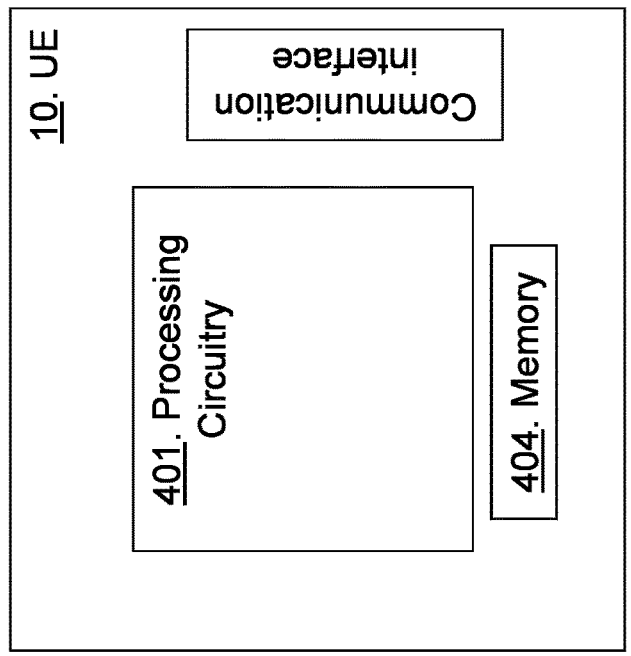
FIG. 4A is a block diagram depicting a UE according to embodiments herein.
Figure 4A:
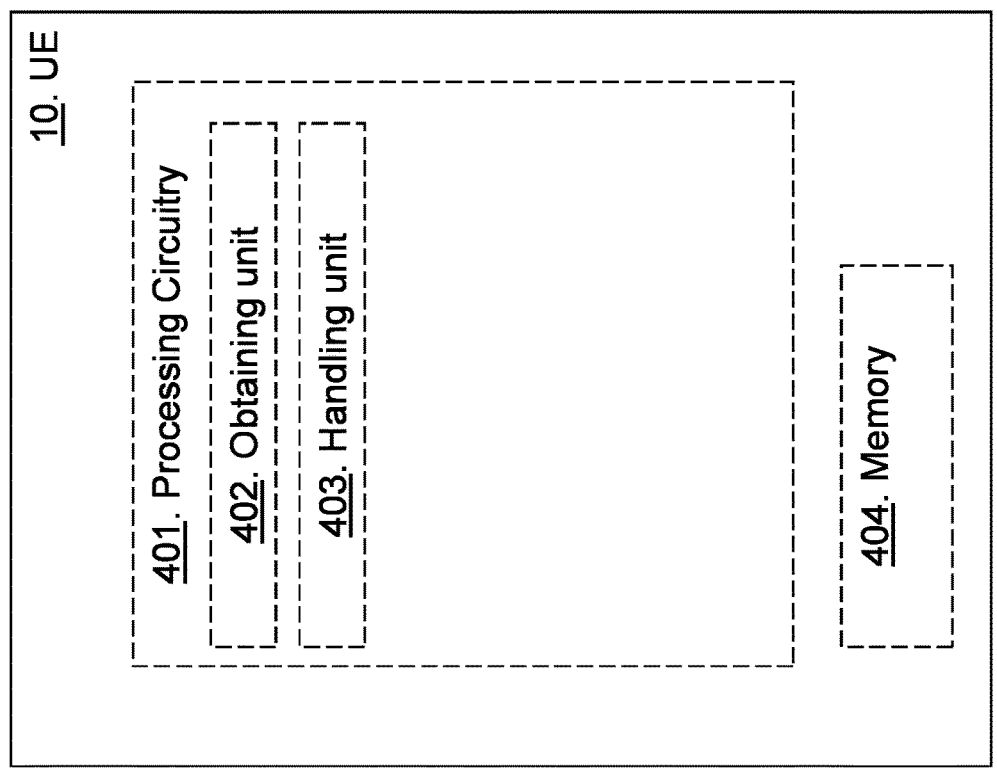
Figure 4A:
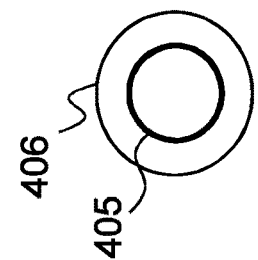

Considering any of the above and the geographical position of the RX UE 10' (geographical coordinate or zone ID), the RX UE 10' can determine whether to respond with HARQ feedback or not based on the geographical position of the RX UE 10', FIG. 4A is a block diagram depicting the UE 10 for handling communication in the wireless communication network according to embodiments herein.

The UE 10 may comprise processing circuitry 401, e.g. one or more processors, configured to perform the methods herein.

The UE 10 may comprise a configuring unit 402. The UE 10, the processing circuitry 401, and/or the configuring unit 402 may be adapted to obtain the mapping from a radio network node or internally. E.g. obtain configuration data such as a mapping of an indication of a communication range requirement of a data unit and an indication of a radio resource associated to communication such as LCID, DRB, CRG or resource pool. E.g. the one or more communication range values may be associated or mapped by configuration, e.g. RRC configuration, to a specific LCID or to a specific DRB identity, or to a resource pool identity, or to a communication range group (CRG).

The UE 10 may comprise a handling unit 403, e.g. a receiver, a transmitter or a transceiver module. The UE 10, the processing circuitry 401, and/or the handling unit 403 is configured to handle the one or more data units based on the communication range requirement of the one or more services by using a mapping between the communication range requirement of the one or more data units and an indication of a radio resource associated to communication, wherein the one or more data units are associated with the one or more services. E.g. handle one or more data units e.g. handle transmission based on the communication range requirement of one or more services, wherein the one or more data units are associated with the one or more services, e.g. there might be multiple SDUs multiplexed into one PDU. The one or more communication range values may be mapped to a specific LCID or to a specific DRB identity, or to a resource pool identity, or to a communication range group.

The UE 10, the processing circuitry 401, and/or the handling unit 403 may be configured to multiplex data units into a same protocol data unit, wherein the data units have a set communication range requirement(s). The UE 10, the processing circuitry 401, and/or the handling unit 403 may be configured to multiplex data units into a same protocol data unit, of all logical channels associated to a same communication range requirement. The UE 10, the processing circuitry 401, and/or the handling unit 403 may be configured to transmit data units in, or using, resources from a resource pool with a matching communication range requirement. The UE 10, the processing circuitry 401, and/or the handling unit 403 may be configured to: perform a logical channel prioritization procedure; perform a resource pool selection procedure; perform a power control of a transmission; perform a determination of packet geographical relevance; determine the sensing parameter, the resource allocation parameter, and/or the congestion control parameter; determine content of sidelink control information, SCI, on a physical sidelink control channel, PSCCH; and/or determine a congestion control parameter. The other UE 10' with a processing circuitry and/or a handling unit may be configured to determine whether to discard a received packet or not based on communication range requirement.

The UE 10 further comprises a memory 404. The memory comprises one or more units to be used to store data on, such as communication range requirements, indications, configuration indications, mapping of LCG, LCID, applications to perform the methods disclosed herein when being executed, and similar. The UE 10 may comprise a communication interface e.g. one or more antennas.

The methods according to the embodiments described herein for the UE 10 are respectively implemented by means of e.g. a computer program product 405 or a computer program, comprising instructions, i.e., software code portions, which, when executed on at least one processor, cause the at least one processor to carry out the actions described herein, as performed by the UE 10. The computer program product 405 may be stored on a computer-readable storage medium 406, e.g. a disc, a universal serial bus (USB) stick or similar. The computer-readable storage medium 406, having stored thereon the computer program, may comprise the instructions which, when executed on at least one processor, cause the at least one processor to carry out the actions described herein, as performed by the UE 10. In some embodiments, the computer-readable storage medium may be a transitory or a non-transitory computer-readable storage medium.

Figure 4B:
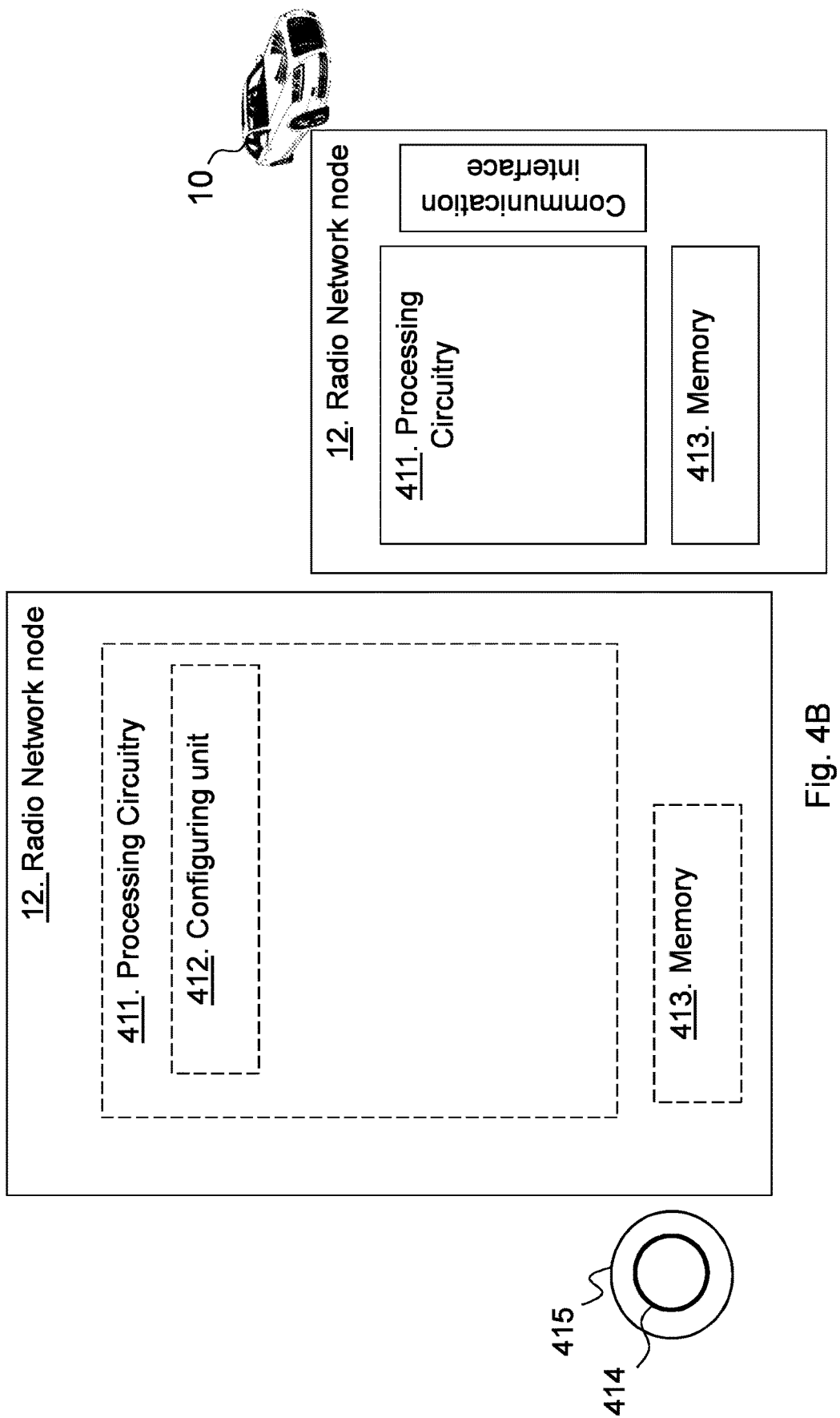
FIG. 4B is a block diagram depicting a radio network node according to embodiments herein.

FIG. 4B is a block diagram depicting the radio network node 12 for handling communication for the UE such as the transmitting UE 10' and the receiving UE 10' e.g. in vehicle to anything communication according to embodiments herein.

The radio network node 12 may comprise processing circuitry 411, such as one or more processors, configured to perform methods herein.

The radio network node 12 may comprise a configuring unit 412. The radio network node 12, the processing circuitry 411, and/or the configuring unit 412 is adapted to configure or transmit, to the UE, configuration data such as a mapping of an indication of a communication range requirement of one or more data units and an indication of a radio resource associated to communication.

The radio network node 12 further comprises a memory 413. The memory comprises one or more units to be used to store data on, such as communication range requirements, indications, configuration indications, mapping of LCG, LCID, applications to perform the methods disclosed herein when being executed, and similar. The radio network node may comprise a communication interface e.g. one or more antennas.

The methods according to the embodiments described herein for the radio network node 12 are respectively implemented by means of e.g. a computer program product 414 or a computer program, comprising instructions, i.e., software code portions, which, when executed on at least one processor, cause the at least one processor to carry out the actions described herein, as performed by the radio network node 12. The computer program product 414 may be stored on a computer-readable storage medium 415, e.g. a disc, a USB stick or similar. The computer-readable storage medium 415, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 5:
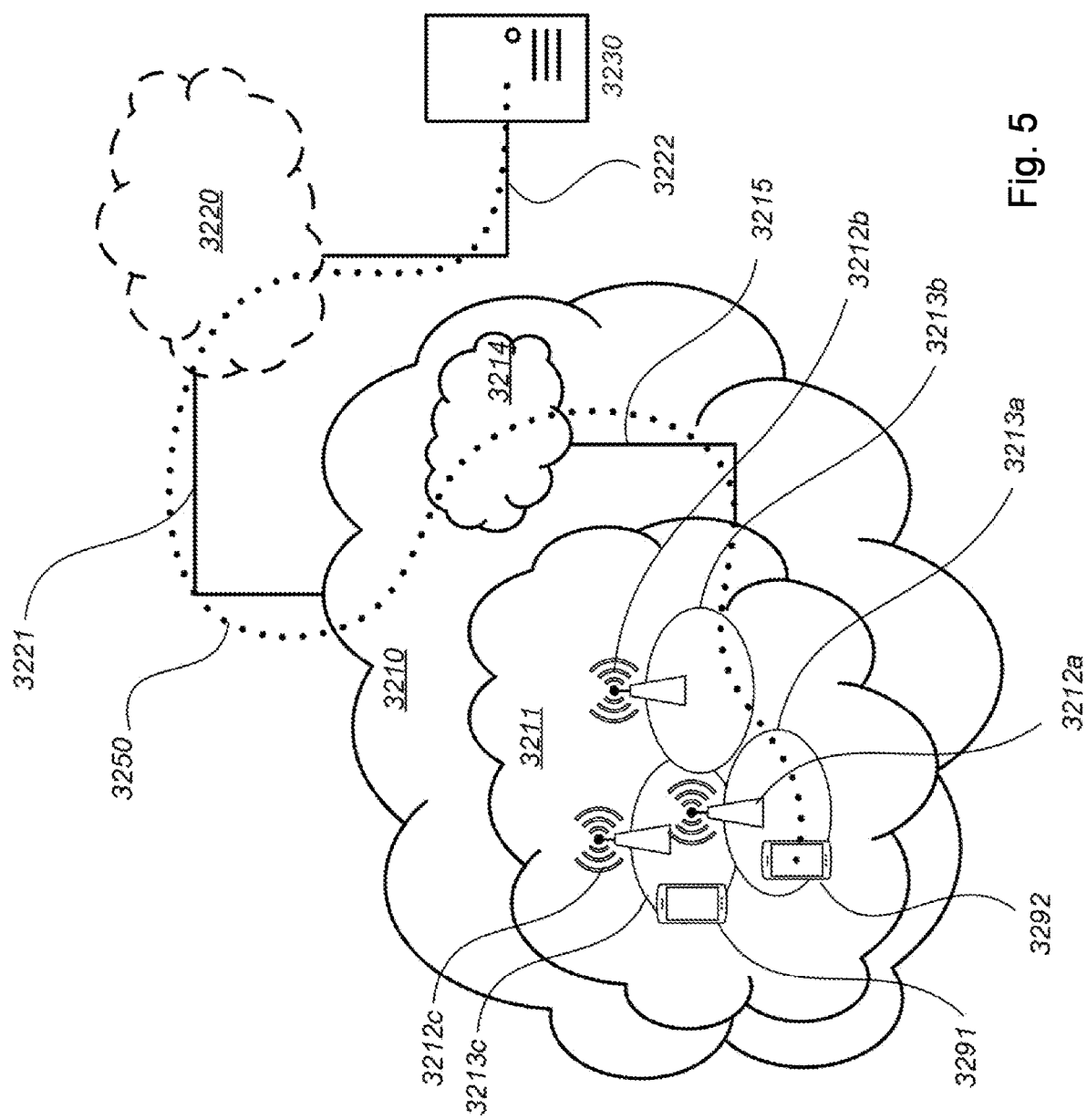
FIG. 5 shows a telecommunication network connected via an intermediate network to a host computer in accordance with some embodiments.

FIG. 5 shows a telecommunication network connected via an intermediate network to a host computer in accordance with some embodiments.

With reference to FIG. 5, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 5 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 6:
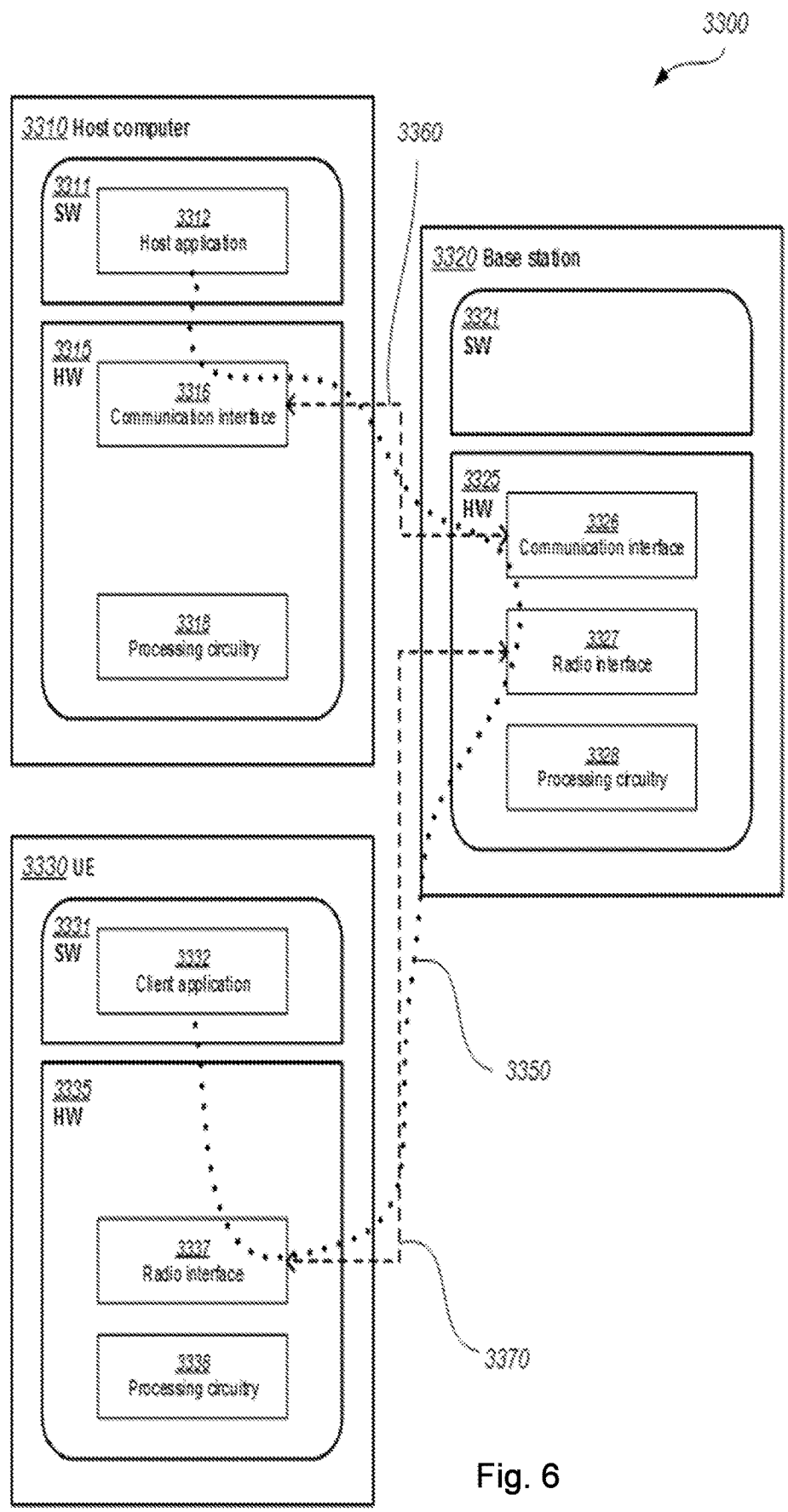
FIG. 6 shows a host computer communicating via a base station with a user equipment over a partially wireless connection in accordance with some embodiments.

FIG. 6 shows a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 6. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 6) served by base station 3320. Communication interface 3326 may be configured to facilitate connection 3360 to host computer 3310. Connection 3360 may be direct or it may pass through a core network (not shown in FIG. 6) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3335 may include radio interface 3337 configured to set up and maintain wireless connection 3370 with a base station serving a coverage area in which UE 3330 is currently located. Hardware 3335 of UE 3330 further includes processing circuitry 3336, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3336. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 6 may be similar or identical to host computer 3230, one of base stations 3212a, 3212b, 3212c and one of UEs 3291, 3292 of FIG. 5, respectively. This is to say, the inner workings of these entities may be as shown in FIG. 6 and independently, the surrounding network topology may be that of FIG. 5.

In FIG. 6, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency since the resources are used based on communication range requirements to optimize e.g. power and resource allocation and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 7 shows methods implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 8 shows methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

| Abbreviation | Explanation |
| --- | --- |
| 3G | Third Generation of Mobile Telecommunications Technology |
| BSM | Basic Safety Message |
| BW | Bandwidth |
| BSR | Buffer Status Report |
| CAM | Cooperative Awareness Message |
| CBR | Channel Busy Ratio |
| DPTF | Data Packet Transmission Format |
| D2D | Device-to-Device Communication |
| DENM | Decentralized Environmental Notification Message |
| DSRC | Dedicated Short-Range Communications |
| eNB | eNodeB |
| ETSI | European Telecommunications Standards Institute |
| LTE | Long-Term Evolution |
| NW | Network |
| RS | Reference Signals |
| TF | Transport Format |
| SAE | Society of the Automotive Engineers |
| UE | User Equipment |
| V2I | Vehicle-to-Infrastructure |
| V2P | Vehicle-to-Pedestrian |
| V2V | Vehicle-to-(vehicle) communication |
| V2x | Vehicle-to-anything-you-can-imagine |
| wrt | with respect to |
| SPS | Semi Persistent Scheduling |
| DMRS | Demodulation reference signals |
| OCC | Orthogonal cover code |
| PDCCH | Physical Downlink Control Channel |
| DBS | Delay-Based Scheduler |
| MAC | Medium Access Control |
| MAC CE | MAC Control Element |
| PUSCH | Physical Uplink Shared Channel |
| PUCCH | Physical Uplink Control Channel |
| PDU | Packet Data Unit |
| 3GPP | Third Generation Partnership Project |
| LCID | Logical Channel Identity |
| MAC | Medium Access Control |
| MAC CE | Medium Access Control - Control Element |
| RRC | Radio Resource Control |
| IP | Internet Protocol |
| PPPP | ProSe Per Packet Priority |
| ProSe | Proximity Services |
| PRB | Physical Resource Block |
| SL | Sidelink |
| SPS | Semi-Persistent Scheduling |
| UL | Uplink |
| DL | Downlink |
| LCG | Logical Channel Group |
| SFN | System Frame Number |
| TTI | Transmission Time Interval |
| SCI | Sidenlink Control Information |
| CA | Carrier Aggregation |
| SLRB | Sidelink Radio Bearer |
| UICC | Universal Integrated Circuit Card |
| ME | Mobile Equipment |
| ID | Identifier |
| PDB | Packet Delay Budget |
| CBR | Congestion Busy Ratio |
| SDU | Service Data Unit |
| PDU | Protocol Data Unit |
| BLER | Block Error Rate |
| CRG | Communication Requirement Group |
| AS | Access stratum |

The invention claimed is:

1. A method performed by a user equipment (UE) for handling communication in a wireless communication network, the method comprising:
  obtaining first communication range requirement information indicating a first communication range requirement for a first service, wherein the first communication range requirement information specifies a first minimum length and/or a first maximum length;
  obtaining a first data unit associated with the first service; and
  handling the first data unit based on the first communication range requirement for the first service, wherein a mapping associates the first service with the first communication range requirement, and
  handling the first data unit comprises adding the first data unit to a protocol data unit (PDU) containing only data units that are associated with a service having the same communication range requirement as the first service.

2. The method of claim 1, further comprising
  obtaining the mapping from a radio network node or internally.

3. The method of claim 1, wherein the mapping associates the first service with the first communication range requirement by mapping a first logical channel to which the first service is mapped to the first communication range requirement.

4. The method of claim 1, wherein handling the first data unit comprises transmitting the first data unit using resources from a resource pool with a matching communication range requirement.

5. The method of claim 1, wherein handling the first data unit comprises performing a logical channel prioritization procedure.

6. The method of claim 1, wherein handling the first data unit comprises performing a resource pool selection procedure.

7. The method of claim 1, wherein handling the first data unit comprises performing a transmission of the first data unit using a transmission power associated with the first communication range requirement.

8. The method of claim 1, wherein handling the first data unit comprises performing a determination of packet geographical relevance.

9. The method of claim 1, wherein handling the first data unit comprises determining a sensing parameter, a resource allocation parameter, and/or a congestion control parameter.

10. The method of claim 1, wherein handling the first data unit comprises determining content of sidelink control information on a physical sidelink control channel.

11. The method of claim 1, wherein one or more communication range values are mapped to a specific logical channel identity or to a specific data radio bearer identity, or to a resource pool identity, or to a communication range group.

12. A user equipment (UE) for handling communication in a wireless communication network, the UE comprising:
  a transmitter;
  a receiver;
  memory; and
  processing circuitry comprising a processor, wherein the UE is configured to perform a process comprising:
    obtaining first communication range requirement information indicating a first communication range requirement for a first service, wherein the first communication range requirement information specifies a first minimum length and/or a first maximum length;
    obtaining a first data unit associated with the first service; and
    handling the first data unit based on the first communication range requirement for the first service, wherein a mapping associates the first service with the first communication range requirement, and
    handling the first data unit comprises adding the first data unit to a protocol data unit (PDU) containing only data units that are associated with a service having the same communication range requirement as the first service.

13. The UE according to claim 12, wherein the UE further configured to obtain the mapping from a radio network node or internally.

14. A computer program product comprising a non-transitory computer readable medium storing instructions, which, when executed on at least one processor, cause the at least one processor to carry out the method of claim 1.

15. The method of claim 1, wherein
the first communication range requirement information specifies a first minimum length in units of meters, and/or
the first communication range requirement information specifies a first maximum length in units of meters.

16. The method of claim 1, wherein
the first communication range requirement information specifies a first minimum length in units of meters.

\* \* \* \* \*